Aug. 3, 1965  E. L. CHAFFEE  3,198,062
FLAME PHOTOMETERS
Filed May 12, 1960  7 Sheets-Sheet 1

Inventor
Emory Leon Chaffee
By his Attorney
George C. Fuller

Aug. 3, 1965   E. L. CHAFFEE   3,198,062
FLAME PHOTOMETERS
Filed May 12, 1960   7 Sheets-Sheet 2
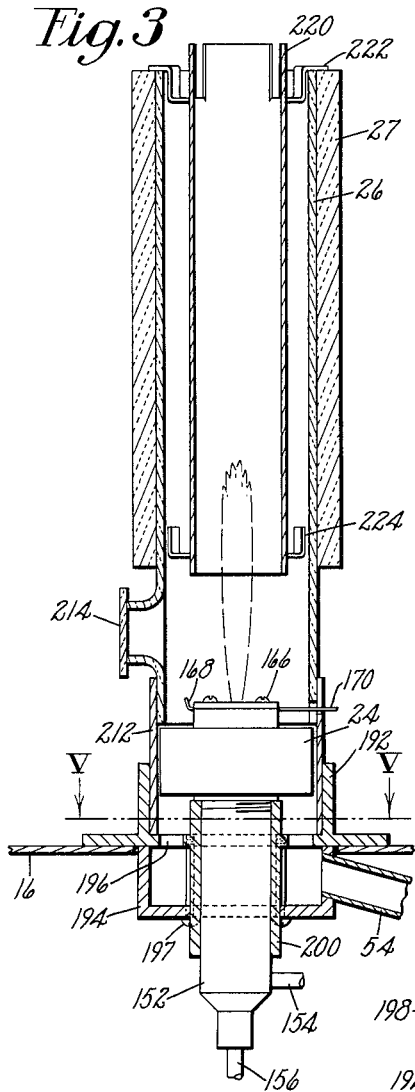
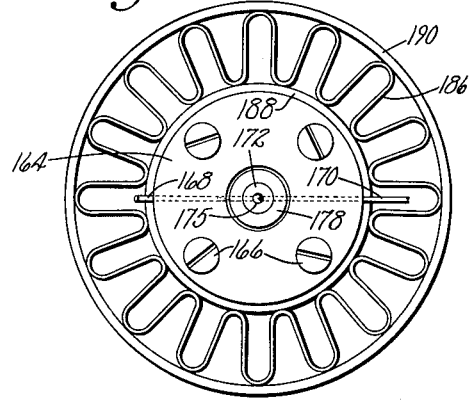
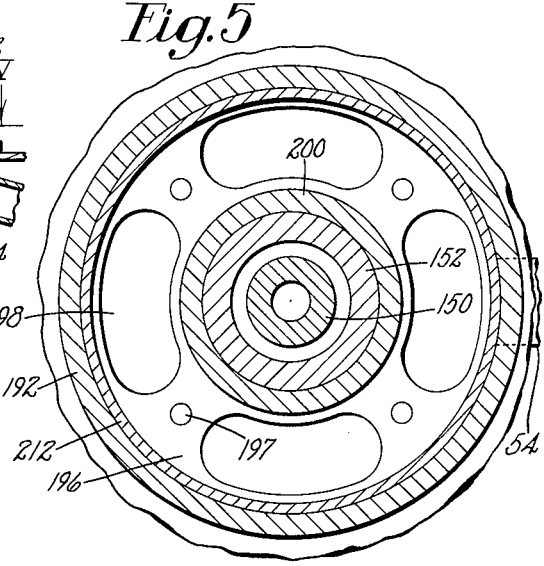

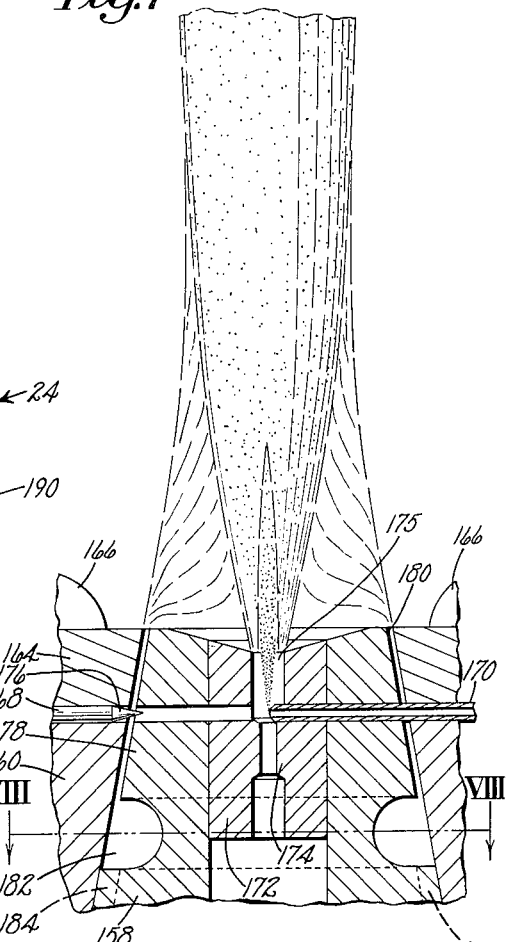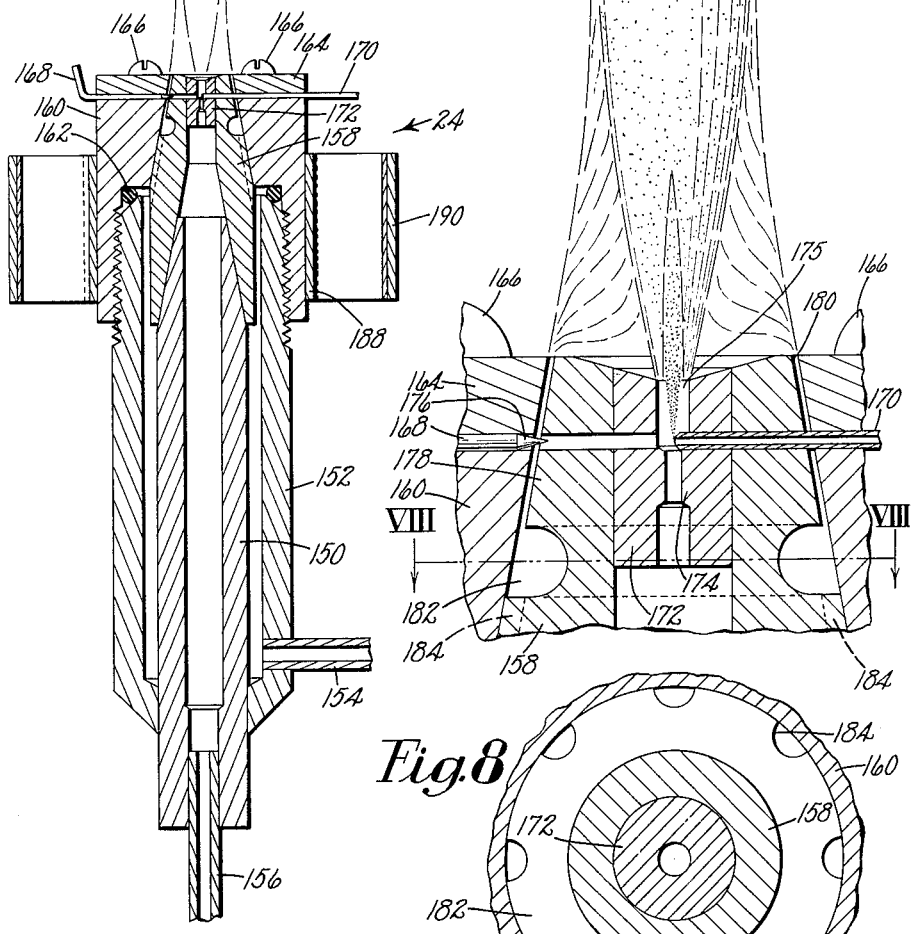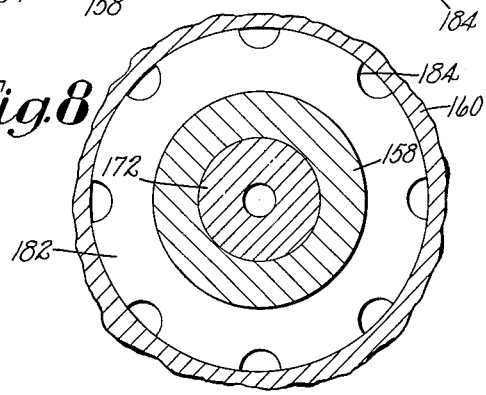

Aug. 3, 1965  E. L. CHAFFEE  3,198,062
FLAME PHOTOMETERS
Filed May 12, 1960  7 Sheets-Sheet 5

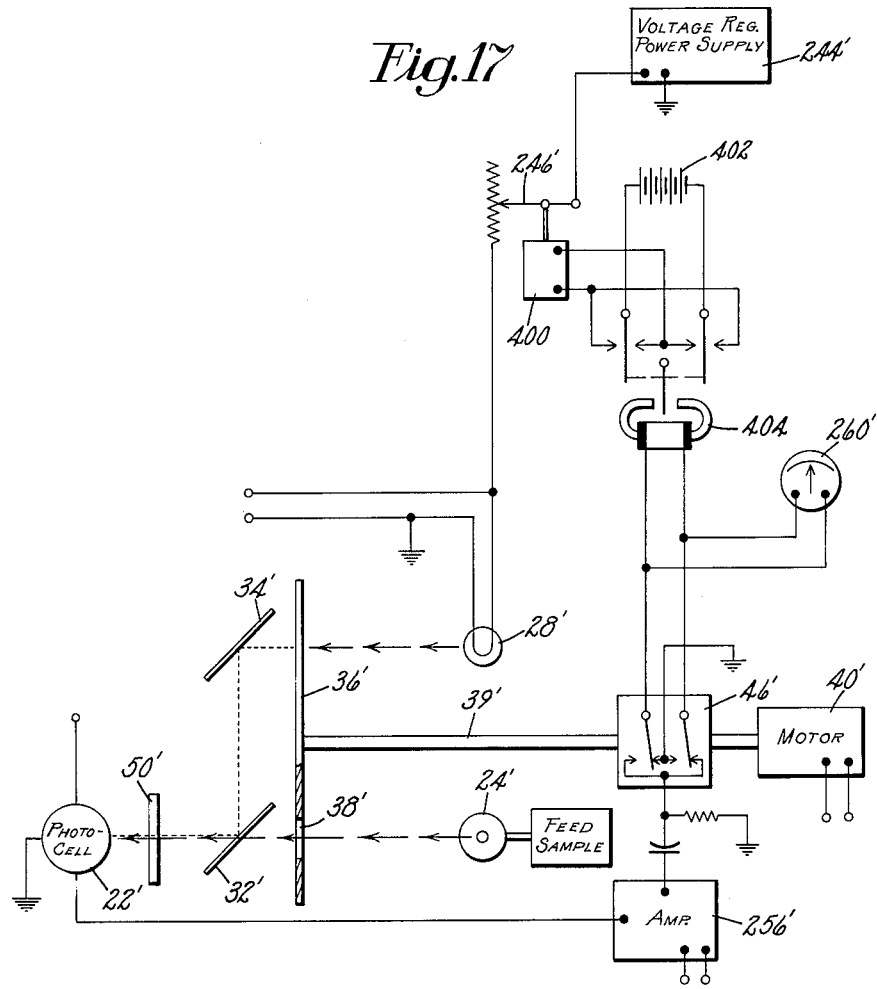

United States Patent Office 3,198,062
Patented Aug. 3, 1965

3,198,062
FLAME PHOTOMETERS
Emory Leon Chaffee, Belmont, Mass., assignor to Frederick G. Keyes Incorporated, Cambridge, Mass., a corporation of Massachusetts
Filed May 12, 1960, Ser. No. 28,733
5 Claims. (Cl. 88—14)

This invention relates to flame photometers and more particularly to improvements in flame photometers providing high sensitivity with increased reliability and reproducibility of analytic results.

A flame photometer is a device for determining the concentration of an element in solution by measuring the light radiation at a frequency characteristic of the element produced when the solution is introduced into a flame. Where the sample solution is introduced at a constant rate into a flame of constant form and temperature, a relationship can be established between the intensity of the radiation and the concentration of the element in the solution.

Known forms of flame photometers are subject to drifts or changes in several critical operating conditions. Such conditions include the size and temperature of the flame, the rate and character of sample feed, and the photocell response.

It is a general object of the present invention to provide a flame photometer in which difficulties due to such drifts are minimized or eliminated.

Drift in the size of the flame and in its temperature may be produced by variations in the burner temperature causing variations in the size of the burner ports, thus affecting the flow of the fuel and combustion-supporting gases. Variations in the burner temperature can be produced by heat transmitted thereto from a chimney used to protect the flame from drafts, and, importantly, by changes in the cooling of the burner by variations in the supply of liquid to the flame, as in the case of intermittent feed of sample solution.

Accordingly, it is an object of the present invention to provide a burner structure convenient to fabricate and which provides a high degree of stability in the size and shape of the flame.

Another object is to provide a burner assembly which maintains the burner uniformly cool and to provide in conjunction therewith means for feeding to a sample inlet tube thereof either sample solution or pure solvent at approximately equal and fixed rates.

For high accuracy, the sample should be supplied to the flame at a uniform rate in droplets of uniform size. It is an object of the present invention to provide a burner having a sample inlet tube the tip of which is protected from flame-produced deterioration or from the accumulation of encrustations by disposition of the tip in a gas passage in spaced relation from a burner orifice, and to enhance the uniformity of the droplets supplied to the flame by providing an inlet tube having a tip portion disposed radially of the passage and terminating at a sharp edge.

A further source of drift arises in measuring the intensity of radiation from the flame. Photometers used for this purpose commonly employ a photocell or photomultiplier tube arranged to sense the radiation from the flame for producing at a load resistor an output voltage which is a function of the radiation intensity. In known forms of such photometers, the radiation intensity is either read in terms of such output voltage, or as the difference in the voltage outputs produced in sensing the flame and in sensing a fixed internal standard element also fed into the flame. Because photocells, and particularly photomultiplier tubes are subject to variations in their characteristics, measurements taken thereby, particularly at different levels of illumination, are subject to drift, and frequent calibration with standard solutions are necessary.

It is a further object of the invention to provide in flame apparatus a photometer which is not subject to errors from drift of the response characteristic of a photocell employed therein, and which has a high degree of stability and sensitivity. This is achieved in accordance with a feature of the invention by providing a photometer employing a photocell to indicate the relative intensities of radiation from the flame and from an electric filament lamp, the photometer operating on the principle measuring the lamp filament voltage required to balance the intensities, the filament voltage then being a predetermined function of the intensity of radiation from the flame while any errors from variations or drift in the photocell are eliminated.

Further objects and advantages of the invention will best be understood from the following description taken in conjunction with the accompanying drawings in which:

FIG. 3 is a vertical section, on an enlarged scale, of the burner and chimney assembly;

FIG. 4 is a plan view, on a larger scale, of the burner;

FIG. 5 is a horizontal section on the same scale as FIG. 4 taken on line V—V of FIG. 3;

FIG. 6 is a vertical section of the burner shown in FIG. 4 on the same scale;

FIG. 7 is a partial section, on a greatly enlarged scale, of a portion of the burner shown in FIG. 6;

FIG. 8 is a partial horizontal section on the same greatly enlarged scale taken on line VIII—VIII of FIG. 7;

FIG. 17 illustrates diagrammatically a modification useful for continuous process control.

Figure 1:
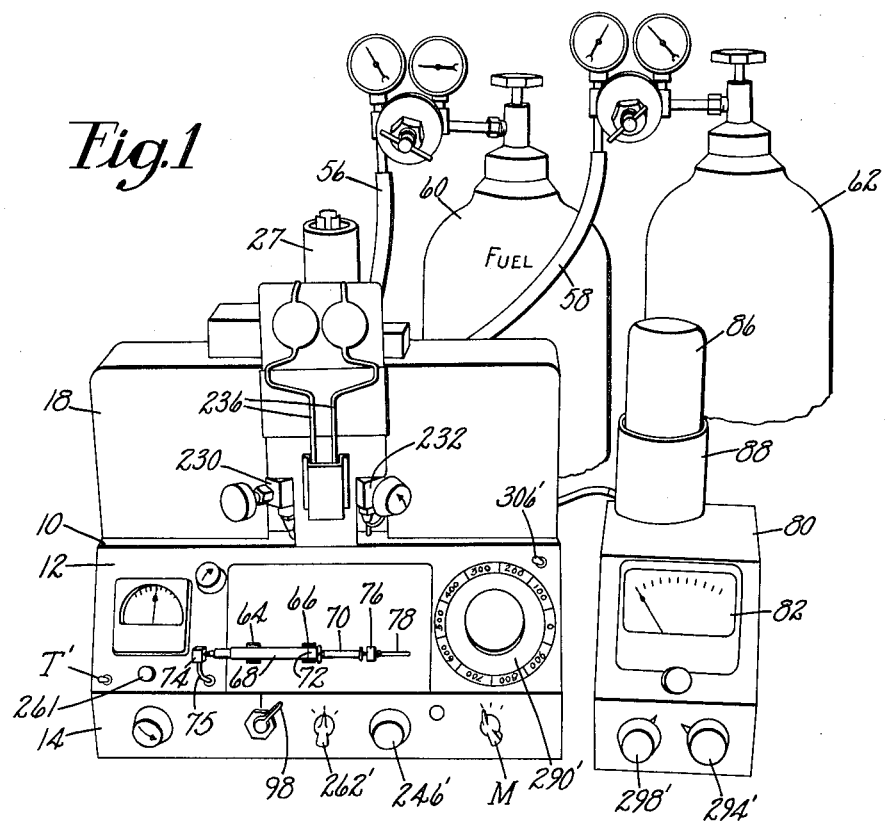
FIG. 1 is a perspective view of a flame photometer embodying the present invention as seen from the front.
Figure 2:
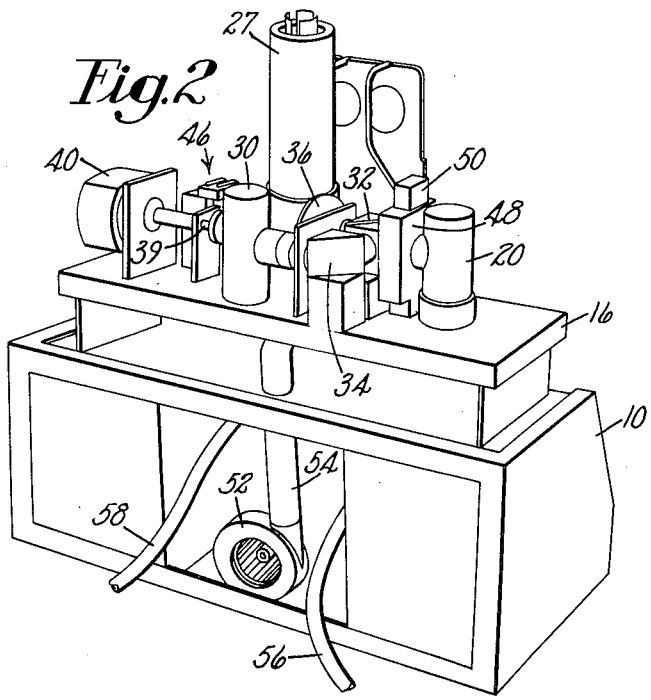
FIG. 2 is a perspective view of the apparatus of FIG. 1 as seen from the left rear with a cover removed.
Figure 16:
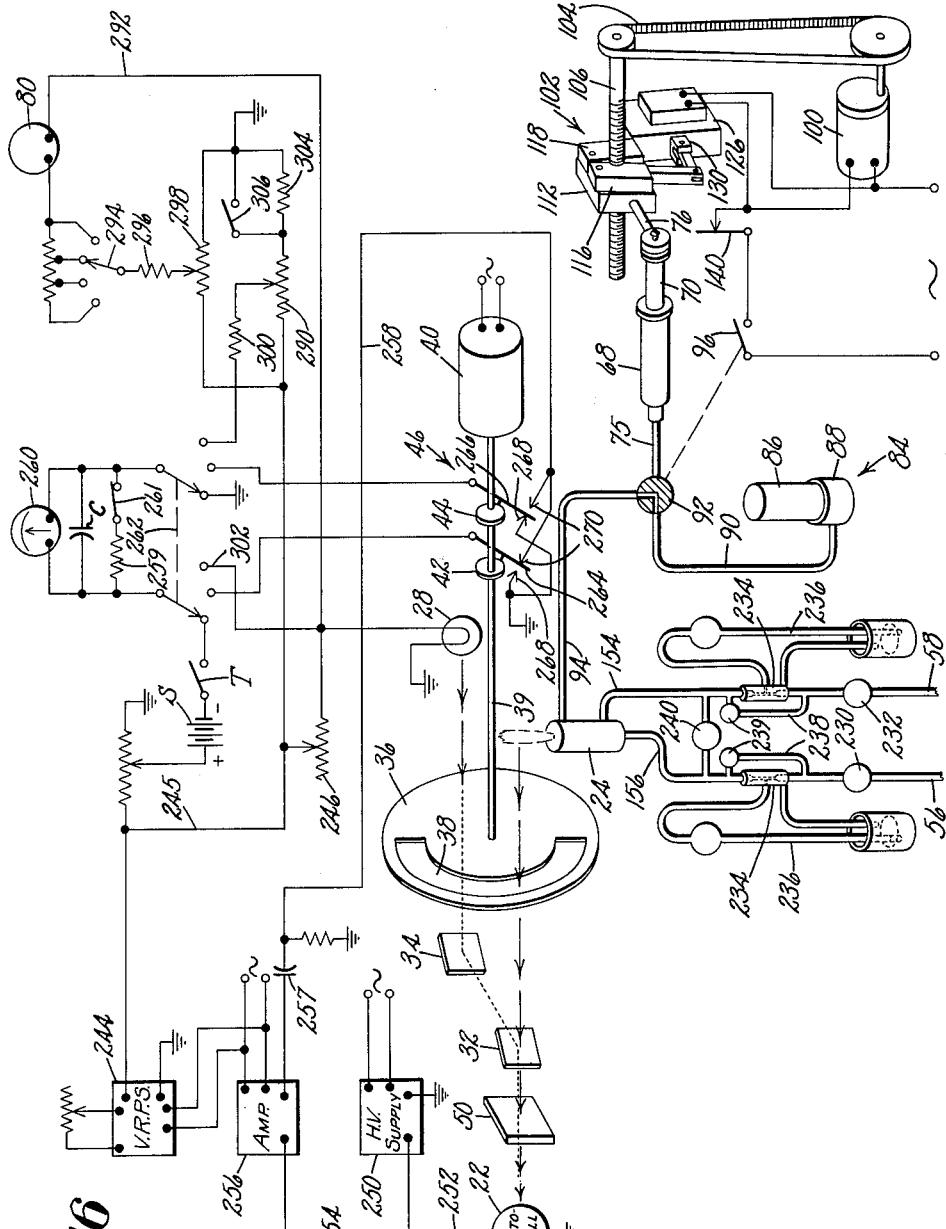
FIG. 16 illustrates diagrammatically the apparatus shown in FIG. 1.

Referring to FIGS. 1, 2, and 16 of the drawings, the illustrative apparatus comprises a cabinet 10 having a sloping panel 12 and bottom apron portion 14. Supported on the cabinet at its top is a chassis 16 over which fits a cover 18.

Mounted at one end of the chassis 16 in a housing 20 is a photocell 22, suitably of the photomultiplier type. A burner 24 disposed inside a glass chimney 26 having an outer layer 27 of asbestos, and a tungsten filament lamp 28 inside a housing 30 are mounted side by side near the middle of the chassis so that the photocell is subjected to radiation from the flame of the burner traveling in a straight path through a partly-silvered mirror 32, as well as to radiation from the lamp through a second path reflecting from the mirrors 32 and 34. A circular shutter 36 having a semi-circular slot 38 is mounted on a shaft 39 driven by a motor 40 to switch the radiant energy in the paths alternately to subject the photocell to radiation from the flame and from the lamp. In addition to the shutter 36 the shaft 39 carries two cams 42, 44 of a synchronous rectifier 46 the operation of which is described hereinafter in greater detail.

Interposed in the path from the mirror 32 to the photocell 22 is a holder 48 adapted to receive an interference filter 50 interchangeable with other filters for selecting the frequency band appropriate to the element the concentration of which is to be determined.

At the rear of the cabinet is mounted a motor-driven fan 52 from which a conduit 54 extends to the base of the chimney 26 for providing cooling air. Two tubes 56 and 58 connect the burner to sources of fuel gas and combustion-supporting gas, illustrated as high-pressure tanks 60, 62 of hydrogen and oxygen, respectively, with appropriate reducing valves and fittings.

Figure 9:
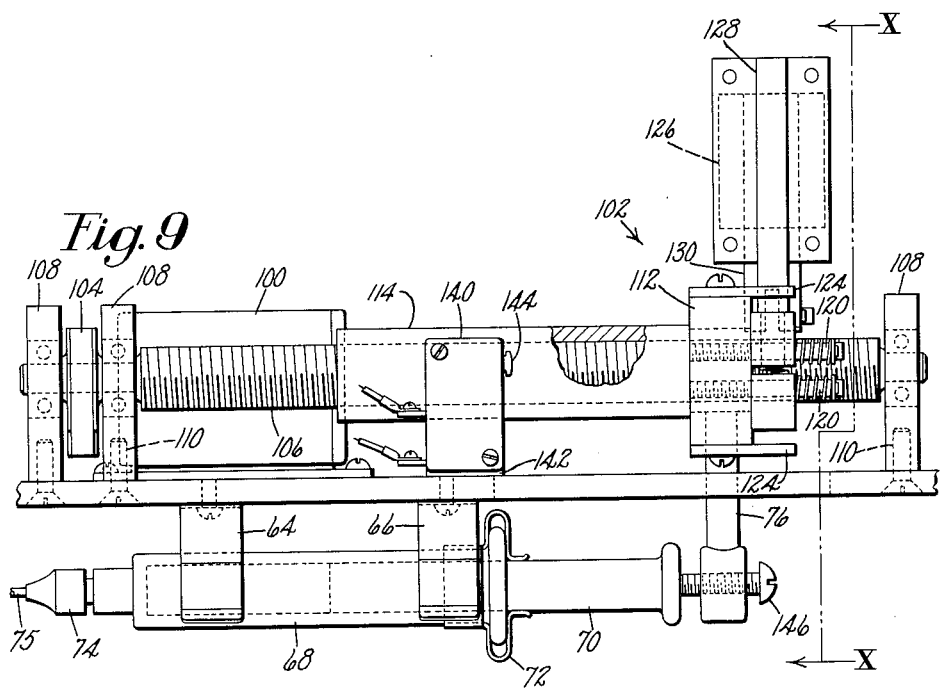
FIG. 9 is a plan view, partly in section, of a portion of the apparatus shown in FIG. 1 on a larger scale.
Figure 10:
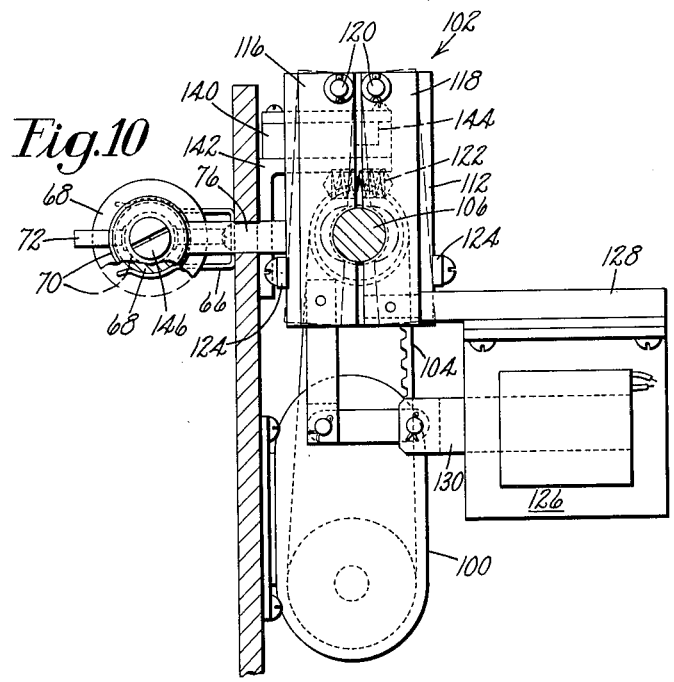
FIG. 10 is a transverse vertical section taken on line X—X of FIG. 9.

In the center of the panel 12, as also seen in FIGS. 9 and 10, two clips 64 and 66 are attached to the cabinet for holding thereon a syringe 68 of the hypodermic type having a piston 70 yieldingly supported against free sliding by a friction clip 72. A coupling 74 attached to a tube 75, suitably of stainless steel, provides a means for connecting the syringe to the burner while the end of the piston 70 is engaged by an arm 76 (FIG. 1) movable in a slot 78 and power-driven as hereinafter described to move the piston lengthwise of the syringe to provide a fixed rate feeder for feeding sample solution to the burner at a predetermined uniform rate.

On the right of the cabinet 10 as seen in FIG. 1, is a voltmeter 80 having a dial 82 for indicating roughly the results of the measurements. Disposed upon the meter is a constant-pressure source 84 (FIG. 16) of distilled water, of the chicken-feeder or barometric type comprising a bottle 86 of water disposed in inverted disposition in an open-topped tank 88, from which extends a tube 90 (FIG. 16) for connecting the source of water to the burner. The tubes 75 and 90 are connected to a three-way valve 92 (FIG. 16) connected in turn to the burner by a tube 94 (FIG. 16) so that rotation of the valve switches the feed to the tube 94 from one source to another. The valve 92 and a switch 96 (FIG. 16) are connected to a lever 98 on the apron 14 for simultaneous operation to connect the tube 94 to the source of sample solution comprising the syringe 68 and, looking now also at FIGS. 9 and 16, to close the switch 96 to energize a motor 100 and a split-nut 102 for operating the arm 76. The motor 100 is connected through a toothed belt 104 to a lead screw 106 journaled in bearings 108 fastened to the panel 12 by screws 110. A carriage 112 (see FIGS. 9 and 10), comprising a guide tube portion 114 slidable along the lead screw 106 and carrying the arm 76, has supported thereon two split-nut portions 116 and 118 pivoted on spring-headed pins 120 for movement into and out of threaded engagement with the lead screw. The portions 116 and 118 are normally held out of such engagement by a spring 122 which is seated at opposite ends in pockets in the portions and urges them outwardly against detent arms 124 in the dashed position shown in FIG. 10. For operating the split-nut, a solenoid 126 has its frame 128 attached to the free end of one split-nut portion 118 while its armature 130 is linked to the other portion 116. Accordingly, energization of the solenoid urges the two portions inwardly to engage the lead screw, and with the motor 100 operating, the carriage 112 will be driven along the lead screw, being held from rotation therewith by the arm 76 extending through the slot 78. Means are provided to stop the power-driven movement of the carriage 112 automatically when it has reached a predetermined position corresponding to the desired limit of travel of the piston 70 of the syringe. To this end, a limit switch 140 is mounted on a bracket 142 attached to the panel. The switch 140 has an actuating pin 144 which is engaged by the carriage 112 at the end position to open the switch contacts. Fne adjustment of either the initial or the end position of the syringe piston may conveniently be made by adjusting a screw 146 threaded through the end of the arm 76.

Turning now to FIGS. 3 through 8, the illustrative burner 24 comprises an inner 150 and an outer 152 conduit, the outer conduit being closed at its bottom against the inner conduit and having an inlet tube 154 communicating with the outer passage between the conduits. The inner conduit 150 is open at the bottom and receives an inlet tube 156. The conduit 150 is tapered at its top to mate with a fitting 158 having an axial opening enlarged conically at its bottom to receive the top of the conduit 150. The top of the fitting 158 is similarly tapered for receipt in a conical recess formed in a cap 160. The base of the recess is enlarged and threaded to receive the threaded top of the conduit 152. An O-ring 162 is employed to make a gas tight seal between the conduit and the cap. A face plate 164 having a central opening formed to provide a continuation of the conical recess of the cap 160 is attached to the cap by screws 166. Shallow radial grooves in the cap serve to hold in opposed disposition a rod 168 and a sample inlet tube 170 clamped between the cap and face plate by the tightening of the screws 166.

As best seen in FIG. 7, the rod 168 and the tube 170 are supported for axial movement through alined holes in the fitting 158 and in an insert 172 which has a press fit with the straight upper portion of the recess in the fitting. The insert 172 has an axial opening having a restriction 174 intermediate its ends. The tube 170 has a tip portion extending radially into the inner passage and terminating at the mouth of the restriction in a sharp edge perpendicular to the axis of the tube, the edge defining an inlet aperture of the tube. The holes in the fitting 158 and the insert 172 diametrically opposite the tube 170 provide an auxiliary gas passage between the outer and inner gas passages, the auxiliary passage terminating at one end in an opening into the inner passage opposite the inlet orifice of the tube, and terminating at its other end in an opening into the outer gas passage. The rod 168 terminates in a conically tapered end 176 forming a closure for the latter opening which closure is adjustable by adjustment of the axial position of the rod. In operation the rod is adjusted to permit some of the gas in the outer passage to flow through the auxiliary passage into the inner passage. The adjustment is readily made; if there is too little flow the flame is irregular, if too much the flame becomes less effective as indicated by less color. I believe, although without intending any limitation thereby that the flow operates in part by insuring that the gas stream from the restriction is laterally supported to flow past the inlet aperture at high velocity for shearing the liquid issuing from the inlet tube against its sharp edge to produce a fine dispersion.

The fitting 158 has an upper tip portion 178 of reduced diameter conveniently formed during the machining of the tapered top by a step reduction in the diameter of the taper. This provided for accurate concentricity of the two tapers, and insures that the passage defined by the opposed walls of the cap 160, face plate 164 and the reduced portion 178 of the fitting 158 is perfectly uniform and terminates in a perfectly symmetrical annular orifice 180. To provide a uniform flow of gas, an equalizing manifold 182 is formed at the base of the reduced portion. The combustion supporting gas, suitably oxygen, is supplied to the manifold 182 by longitudinal grooves 184 in the surface of the fitting 158, which grooves communicate with the manifold and with the main portion of the outer passage.

Surrounding the cap 160 is a heat-exchange grill 186 which is mounted between two concentric rings 188, 190, best seen in FIG. 4.

Referring to FIGS. 3 and 5, the burner 24 is mounted in a base comprising a flanged support member 192 attached to the chassis 16, and a lower member 194 attached to a web portion 196 of the member 192 by screws 197. The web portion 196, formed with apertures 198 to permit passage of air from the conduit 54, supports an upright pipe 200 in which the burner 24 is seated.

The chimney 26 is bonded at its bottom end to a metallic cylinder 212 seated on the member 192. The inside diameter of the cylinder 212 is just sufficient to clear the outer ring 190 of the heat exchanger forcing the passage of air through the grills of the exchanger. The chimney is formed with a window 214 through which light from the flame of the burner can pass to the photocell 22. The layer 27 of insulation, suitably asbestos, is provided to reduce radiation of heat from the chimney into the interior of the case.

As previously mentioned, it is very important to keep the burner elements at a uniformly cool temperature. If this is not done, the flow of gas to the orifices may be affected as by a change in the size of the orifices through expansion. To this end, not only is the chimney constructed of glass which is a good heat insulator, and a long, air-cooled path provided from the base of the chimney to the burner, but a thermal shield 220, comprising a cylinder of metal, suitably stainless steel, is supported in the chimney between it and at least a portion of the flame to minimize the amount of heat radiated to the chimney from the flame. The shield 220 is supported on brackets 222 which also serve as upper spacers, while lower spacers 224 support the lower part of the shield in concentric relation with the chimney. The cooling air which enters via the conduit 54 passes upwardly through the apertures in the web 196, inside the ring 190 and up outside and inside the shield 220, thus achieving high cooling efficiency.

The burner is supplied with fuel and combustion-supporting gases as diagrammed in FIG. 16. The fuel gas, suitably hydrogen or a hydrocarbon such as propane, enters from the tube 56 and passes to a manual control valve 230. The other gas, suitably oxygen, passes to a similar valve 232. Thence the two gases pass through flow meters comprising Venturi sections 234 and indicating columns 236. The sections 234 are by-passed adjustably by sections 238 having valves 239 so that different flow rates of the two gases may be indicated by liquid rising to equal heights in the columns 236. A variable by-pass 240 between the tubes 154 and 156 permits mixing a small proportion of oxygen with the fuel gas, which is desirable when the latter is propane.

The photometer portion of the illustrative apparatus is arranged so that it not only provides high sensitivity and stability, but also so that variations in the light response characteristics of the photocell do not affect the reading. The latter result is accomplished by providing an arrangement in which the reading is taken in a light balanced condition in which the radiations from the flame and the lamp are of equal intensity as sensed by the photocell. The latter therefore is used to compare intensities at a single point on its light response curve instead of at two different points on the curve as where a fixed standard is employed and where a change in the shape of the response characteristic curve of the photocell affecting differently its response at different levels of intensity may introduce error.

Accordingly the illustrative apparatus is provided with a light standard the intensity of which is variable by varying a readily measurable quantity which is a predetermined function of its intensity, means for varying the quantity to equalize the intensities of the flame and the lamp as sensed by the photocell, and means to measure the quantity.

For this purpose, the filament of the lamp 28, a 3-watt 120-volt tungsten-filament bulb, is connected to a source of regulated D.C. voltage 244 through a lead 245 and a rheostat 246 having its arm operated by a knob 246' (FIG. 1) by which the filament voltage may be varied through a range of about 20–100 volts. It will be understood that the filament voltage of the lamp is a stable function of its intensity at any given wave length of light. The use of a filament voltage well below the rated voltage insures long lamp life.

In order to indicate the relative intensities of light from the flame and the lamp, the photocell 22, suitably a photomultiplier tube having its dynodes connected in the conventional manner to a voltage divider (not shown) supplied from the high voltage source 250 via the lead 252, is employed to provide an electrical voltage the level of which depends upon the intensity of the light impinging on the photocell and means are provided to indicate a difference between the levels of the voltage produced when the photocell is subjected to radiation from the flame or from the lamp. Thus the output of the photocell 22 is conducted along a lead 254 to an amplifier 256 A.C. coupled by a capacitor 257 and a lead 258 to the synchronous rectifier 46. The latter operates to convert any A.C. component supplied from the amplifier to a unidirectional current for indication by a galvanometer 260.

The galvanometer 260 is switchable for indicating several voltage conditions, and in addition to a shunt damping capacitor C, has a shunt safety circuit comprising a resistor 259 and a normally closed switch 261 which may be opened to increase the sensitivity of the galvanometer.

Figure 11:
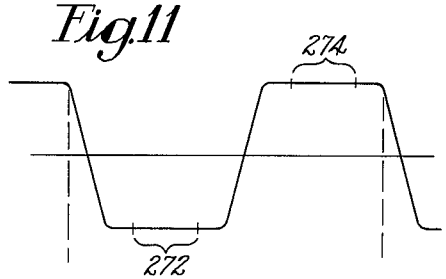
FIGS. 11, 12, 13, 14 and 15 are graphs illustrating certain aspects of the invention.
Figure 12:
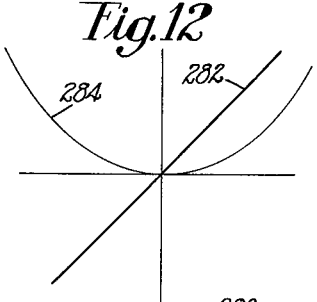
Figure 13:
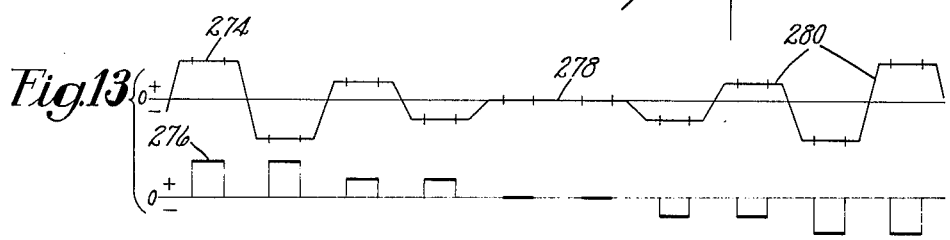

The switching is performed by a two pole triple throw switch 262 operated by a knob 262' on the panel. In one position of the switch, the galvanometer is connected to a supply voltage monitoring circuit comprising a voltage standard S and a test a button T; in a second position the galvanometer is connected to a circuit for indicating light balance; and in the third position the galvanometer is connected to a circuit for measuring the filament voltage of the lamp 28. During operation of the apparatus with the shaft 39 rotating, if the light intensities of the flame and the lamp alternately cast upon the photocell by the revolving shutter 36 are different, the changing D.C. level of the photocell output coupled through the amplifier will produce a wave of A.C. voltage at the rectifier 46 in the form shown in FIG. 11. At the same time, the cams 42 and 44 of the rectifier move two switch blades 264 and 266 (FIG. 16) into and out of engagement with contacts 268, 270 respectively grounded and connected to the lead 258 thus to connect the galvanometer 260 to the output terminals of the amplifier alternately in one and the other of opposite senses in synchronism with the half-wave portions 272, 274 of FIG. 11 to cause corresponding pulses 276 of unidirectional current to flow through the galvanometer and cause it to indicate a state of unbalance of intensities. The rheostat 246 may then be adjusted to change the intensity of the lamp 28 to decrease this current until the galvanometer 260 shows no deflection. At this point, the amplifier output is zero, as indicated at 278 (FIG. 13). Further change of the setting of the rheostat 246 in the same direction indicated by the right portion 280 of FIG. 13 will produce progressively greater current flow in the galvanometer but in the opposite direction, thus indicating the direction of error as well as its magnitude. The rectifier described produces the straight line response characteristic 282 (FIG. 12) as contrasted with the non-directional, non-linear response 284 if a square-law rectifier were used.

When a condition of balance is achieved as indicated by the galvanometer, the filament voltage of the lamp 28 is a known function of the intensity of the flame radiation which in turn reflects the concentration of the element to be measured.

Provision is made in the illustrative apparatus for measuring the filament voltage in either of two ways, one employing the voltmeter 80 for rough measurement, the other employing the galvanometer 260 with a ten-turn precision potentiometer 290.

For measuring the voltage with the voltmeter 80, one terminal thereof is connected via a lead 292 to the ungrounded terminal of the lamp while the other meter terminal is connected through a variable resistance range switch 294 and a fixed resistor 296 to the arm of a potentiometer 298 the resistance unit of which is connected to the lead 245 and to ground across the output of the source of regulated voltage. By adjustment of the potentiometer 298, the voltmeter 80 may be caused to read zero at the filament voltage balancing the flame when fed distilled water. The meter will then directly indicate the incremental voltage on the filament required to balance the flame when fed with sample solution. The switch 294 is used to vary the sensitivity of the meter 80 as appropriate during the steps of obtaining a zero water reading and of taking the final measurement.

For measuring the filament voltage with the potentiometer 290, the switch 262 is positioned to connect the arm of the potentiometer 290 to one terminal of the galvanometer through the resistor 300 while the other terminal is connected via a lead 302 to the ungrounded terminal of the lamp. The resistance element of the potentiometer 290 is connected in series with the shunt combination of a fixed extension resistor 304 and a shorting switch 306, across the regulated source 244 by connection to lead 245 and ground. Accordingly the potentiometer 290 may be adjusted, first roughly with the switch 261 closed, then finely with the switch opened, to balance the filament voltage as indicated by the galvanometer 260. Opening switch 306 changes the range of voltage over which potentiometer 290 acts.

In the operation of the hereinbefore described apparatus, the operator prepares the apparatus for use by turning the main switch control M from its off position to its second position in which power is being supplied to the regulated power supply 244, the amplifier 256, the fan 52, the motor 40, and the circuit for the motor 100 and the solenoid 126, and kindles the burner, adjusting the flow of the gases with the aid of the manometers 236. In the position of the valve 92 shown in FIG. 16, water will then be aspirated into the burner from the tank 88 at a rate controllable by its height and predetermined to be at least approximately equal to the fixed rate of feed from the syringe. Conveniently the rates may be compared by using the photometer to compare the flame radiation intensity when the flame is supplied with water by aspiration with the intensity when supplied with water from the power-driven syringe. This water feed not only avoids subsequent change in the burner temperature upon initiation of sample feed, but also serves to rinse the system free of traces from previous analyses. When ready to take a reading, the switch M is turned to its third position in which, additionally, high voltage is supplied to the photocell 22.

Each time a new flame is established, it is advisable to take a base reading, either with water, or more suitably where, as in the case of calcium, the lower end of the concentration-reading curve is nearly tangent to the abscissa (FIG. 14), with a known solution of the element, for example, 1 p.p.m. A test is taken by filling the syringe with the sample, positioning it in the clips 64 and 66 in operative engagement with the coupling 74 and the arm 76, turning the lever 98 to initate feed of the sample, and with the switch 262 in its center position, adjusting the rheostat 246 until the galvanometer centers at zero. Then the filament voltage is measured by one of the techniques described above, using the meter 80 or the potentiometer 290, either of which may be calibrated to read directly in p.p.m. for any given element. For the purpose of the present description, it is assumed that the potentiometer 290 is used and that its dial measures its position in terms of scale divisions from 0–1000.

The base reading from water or the 1 p.p.m. solution will have established the position of the predetermined calcium curve on the potentiometer reading abscissa by defining the point W or K respectively. The concentration of a sample may then easily be determined by the potentiometer reading, for example, S, of the filament voltage required to balance the flame fed with the sample which in the case of the illustrative calcium curve, corresponds to 2 p.p.m. Occasionally the voltage of the supply 244 is checked by closing the switch T with the switch 262 in the position shown.

Figure 14:
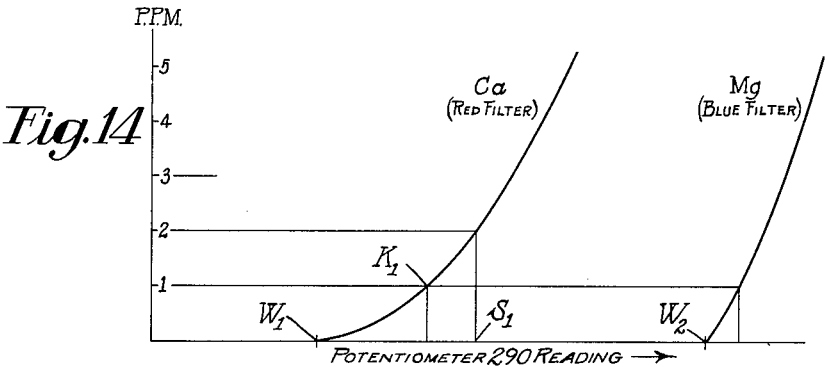

It will be noted from FIG. 14 that the "water reading" depends upon the filter employed because the water flame radiation intensity is different at different wave lengths, being greater in the blue region than in the red region. Thus where the blue filter is employed, as in magnesium analysis a higher water reading $W_2$ obtains than where the red calcium filter is used, as indicated in FIG. 14.

Figure 15:
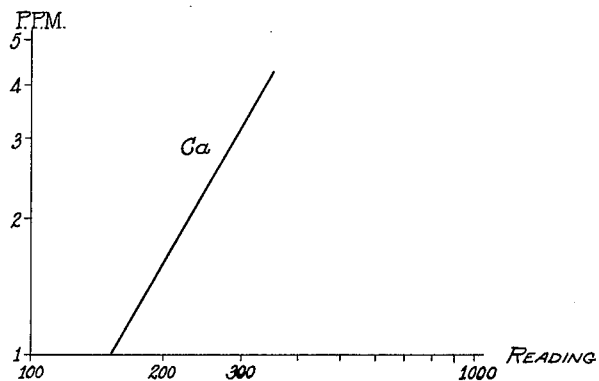

Plotted on a log—log scale, the calcium calibration curve, as well as that of all other elements, becomes a straight line (FIG. 15) and for some purposes it is convenient to employ this scale.

FIG. 17 illustrates a modification suitable to the continuous automatic control of a process as a function of element concentration. In the diagram, elements corresponding to those of the previously described apparatus are designated by prime reference numerals. Thus the modification comprises a photocell 22' arranged for subjection alternately to light from a burner 24' and a lamp 28' along two paths, both passing through a partly silvered mirror 32', the path from the lamp being reflected from the mirror 34'. In each case the light passes through a revolving shutter 36' having a slot 38', the shutter being carried on a shaft 39' driven by a motor 40', rotation of the shaft also operating a synchronous rectifier 46' in the manner previously described. The light passing through a filter 50' falls on the photocell producing an electric signal conducted to the amplifier 256' and supplied in amplified form to the rectifier 46'. In this case, the output of the rectifier is not only supplied to a galvanometer 260' for indication of an unbalance, but also to a servo system for varying the voltage supplied from a regulated source to the lamp 28' in a direction to restore the light balance. For this purpose, a variable resistor 246' connected between the supply and the lamp has its arm connected to a motor 400 for operation thereby in a direction determined by the polarity of energization of the motor from a battery 402. The operation of the motor 400 is controlled from the output of the rectifier 46' by means of a polarized relay 404 having two-pole double-throw contacts connected to the battery 402 and the motor 400 to cause the motor to be driven in one or the other direction selectively in accordance with the sense of energization of the relay, and to disconnect the motor from the battery when the relay is deenergized upon the attainment of a condition of light balance. If any current is then drawn from the lamp terminals reducing the lamp voltage, the servo will operate to restore the voltage, and accordingly the lamp terminals constitute a low impedance source of a control voltage which is a function of element concentration.

For automatic process control, a product line is continuously monitored for a given element by supplying a feed sample at a predetermined rate to the burner for dispersion in the flame. The output voltage at the lamp terminals may then be employed directly or indirectly to control the process in accordance with the concentration of the element as by effecting operation of a valve controlling the concentration of the element in the product line. Alternatively, if desired, the output voltage may be employed to effect the operation of a signal device should the concentration of the element exceed or fall below predetermined limits.

Having thus described my invention, what I claim as new and desire to secure by Letters Patent of the United States is:

1. In apparatus for flame photometry, a burner comprising coaxially arranged inner and outer conduits forming inner and outer passages terminating respectively at a nozzle portion in a center orifice and an annular outer orifice, the orifices being concentric and upwardly facing, a sample inlet tube extending into the inner passage radially thereof and terminating adjacent its center in an inlet aperture, and conduit means forming an auxiliary passage through the inner conduit communicating at one end with a source of gaseous fluid and terminating at the other end in an opening opposite the inlet aperture for supplying a flow of gaseous fluid for lateral support, toward the sample inlet orifice, for dispersing a sample in the gas stream flowing through the inner passage.

2. In apparatus for flame photometry, in combination, a burner for providing a flame and having inlet means for feeding liquid to the burner for dispersion in the flame, a source for supplying pure solvent at a controlled rate, a feeder operable to supply sample solution at a controlled rate, and connecting means between the source, the feeder and the burner including a valve operable to admit liquid from either the source or the feeder to the inlet means.

3. In apparatus for flame photometry, in combination, a burner for providing a flame and having inlet means for feeding liquid to the burner for dispersion in the flame, a constant-pressure liquid source for supplying pure solvent, a power-operated feeder for supplying sample solution at a predetermined rate, and connecting means between the source, the feeder, and the burner including a manually operated valve for admitting liquid from either the source or the feeder to the inlet means.

4. In apparatus for flame photometry, in combination, a burner for providing a flame and having inlet means for feeding liquid to the burner for dispersion in the flame, a constant pressure liquid source for providing pure solvent, means for demountably supporting a syringe including a piston and containing a liquid, power operated means coupled to said piston for operating said piston of said syringe for discharging the contents thereof into said inlet means at a constant rate, connecting means including a three-way valve for admitting liquid from either said source or said syringe to said inlet means, control means including a member connected to said valve and manually movable between a first position in which said valve passes solvent from said constant pressure source to said inlet means and a second position in which said valve passes liquid from said syringe to said inlet means, and a switch coupled to said member and said power operated means and operated in response to movement of said member to its second position for initiating operation of the power means.

5. In apparatus for flame photometry, in combination, a burner for providing a flame and having inlet means for feeding liquid to the burner for dispersion in the flame, a chimney surrounding at least a part of the flame and having window means for transmitting radiation laterally from said flame, a cylindrical shield supported inside the chimney in spaced relation therewith, support means for demountably receiving a syringe for providing sample solution to the flame, a syringe mounted on said support, a power-operated drive mechanism operable to cause said syringe to discharge its contents at a predetermined rate, a constant-pressure liquid source for providing pure solvent to the burner to rinse the inlet means and maintain the burner uniformly cool, connecting means including a three-way valve for admitting liquid from either the source or the syringe to the inlet means, a manually movable member connected to the valve and movable between a first position in which the valve passes liquid from the source to the inlet means and a second position in which the valve passes liquid from the syringe to the inlet means, a switch operated in response to movement of said member to its second position for initiating operation of the drive mechanism, a tungsten filament lamp, a source of filament voltage for the lamp, a light responsive detector arranged in operative relation with the burner and lamp for receiving radiant energy from the flame and from the lamp, an indicator controlled by the detector for indicating the relative intensity of the radiations from the flame and from the lamp, and means for varying the filament voltage supplied to the lamp.

References Cited by the Examiner

UNITED STATES PATENTS

| | | | |
|---|---|---|---|
| 791,923 | 6/05 | Machlet | 158—116 |
| 2,339,754 | 1/44 | Brace | 88—14 |
| 2,664,779 | 6/54 | White | 88—14 |
| 2,706,928 | 4/55 | Lee et al. | 88—14 |
| 2,714,833 | 8/55 | Gilbert | 88—14 |
| 2,753,753 | 7/56 | Gardiner | 88—14 |
| 2,836,097 | 5/58 | Garman | 88—14 |
| 2,857,801 | 10/58 | Murray | 88—14 |
| 2,858,729 | 11/58 | Keys | 88—14 |
| 2,950,396 | 8/60 | Schneider | 88—14 |
| 2,990,748 | 7/61 | Vallee et al. | 88—14 |
| 3,074,308 | 1/63 | Perron et al. | 88—14 |

JEWELL H. PEDERSEN, *Primary Examiner.*

WILLIAM MISIEK, EMIL G. ANDERSON, *Examiners.*